No. 616,227. Patented Dec. 20, 1898.
T. J. DUNLEA.
COMPUTING SCALE.
(Application filed Aug. 23, 1897.)
(No Model.) 4 Sheets—Sheet 3.
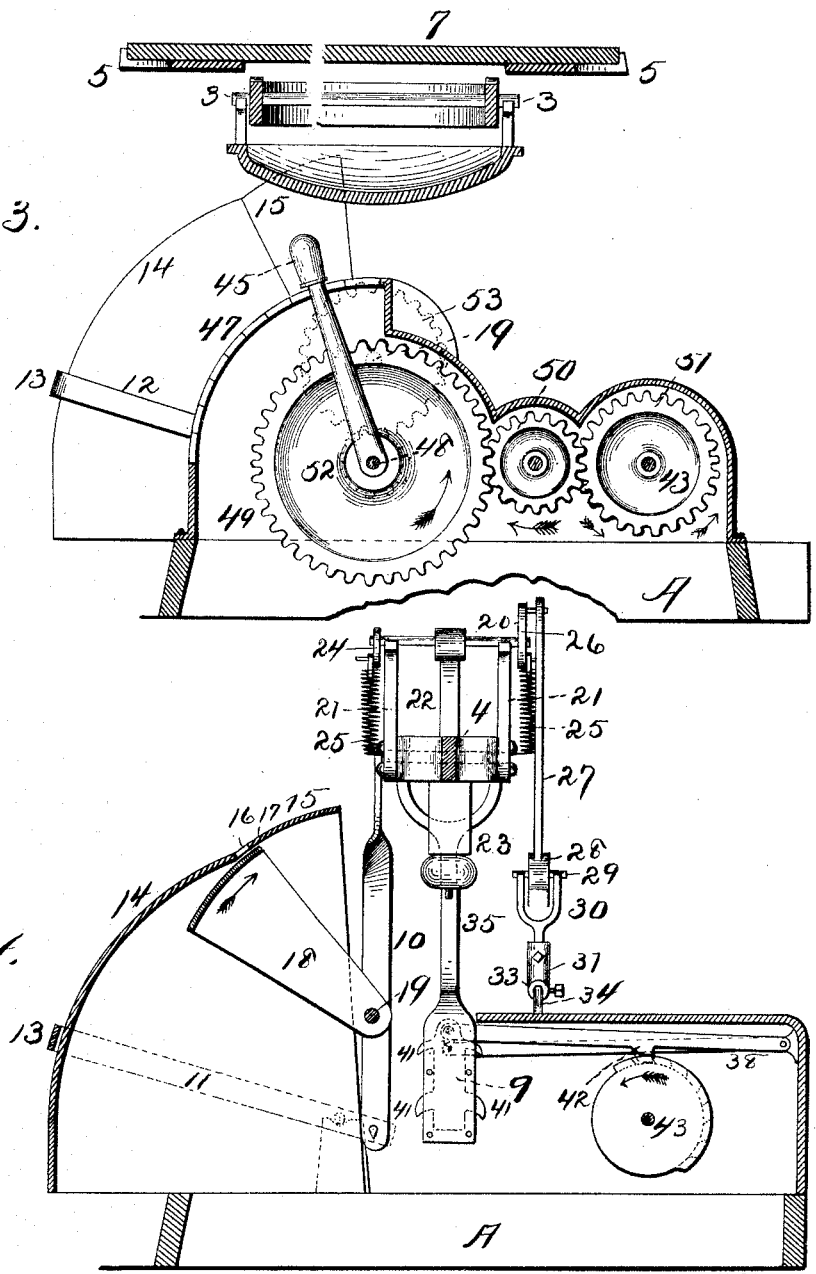
WITNESSES
INVENTOR
Thomas Joseph Dunlea.
BY
Smith & Denison
ATTORNEYS.

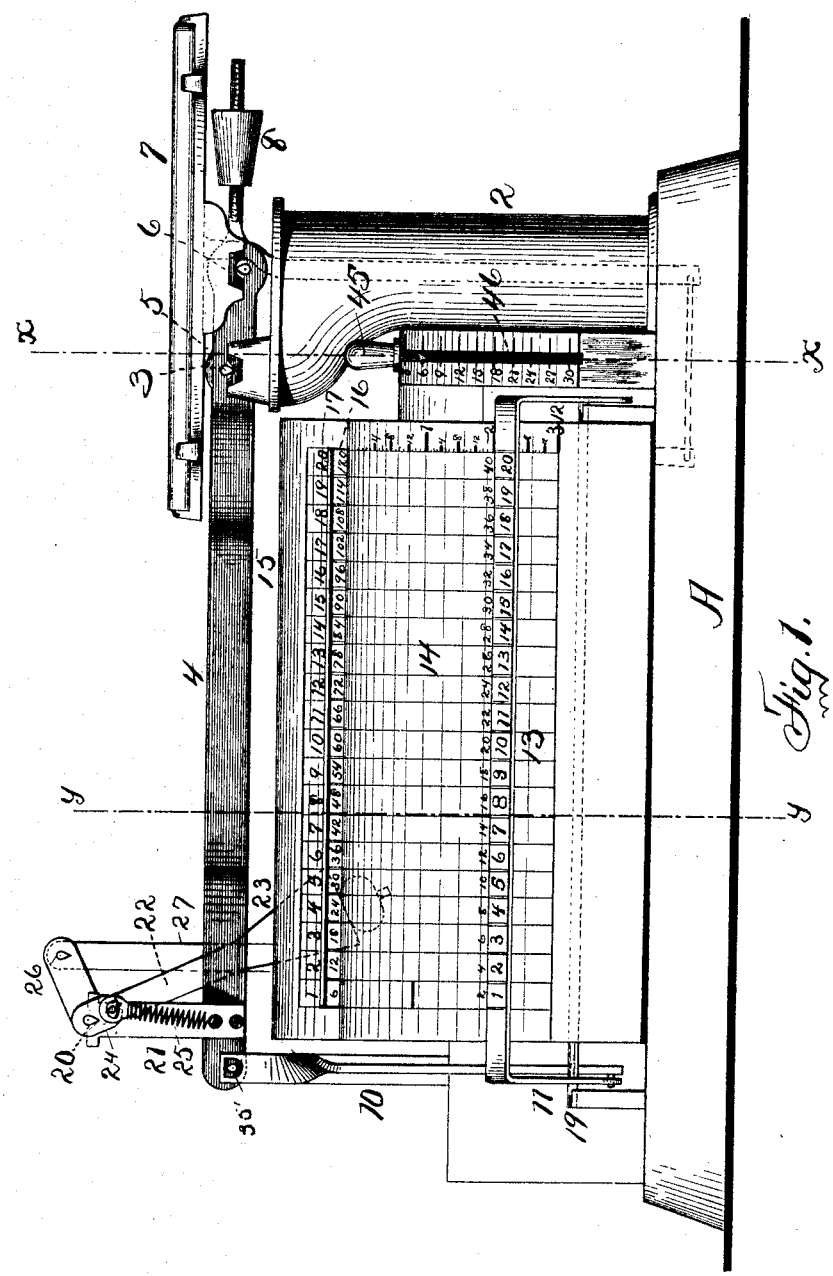

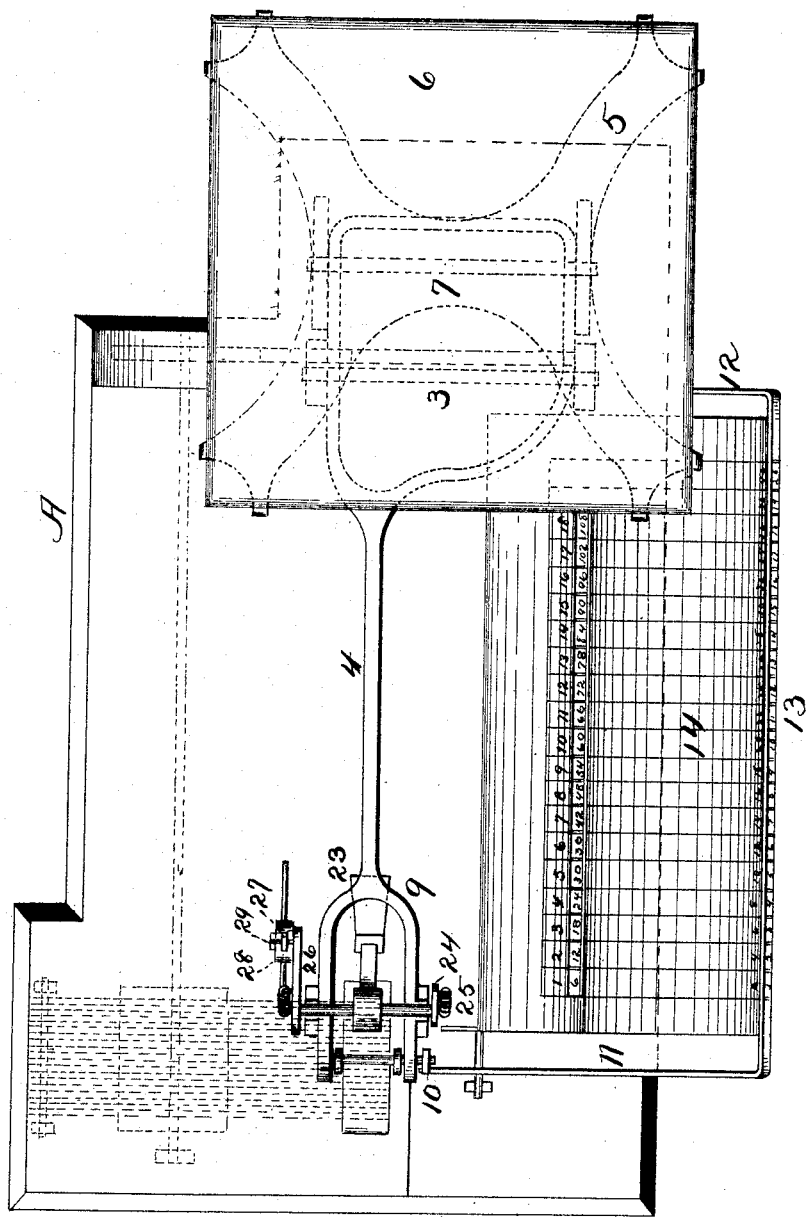

No. 616,227. Patented Dec. 20, 1898.
T. J. DUNLEA.
COMPUTING SCALE.
(Application filed Aug. 23, 1897.)
(No Model.) 4 Sheets—Sheet 4.
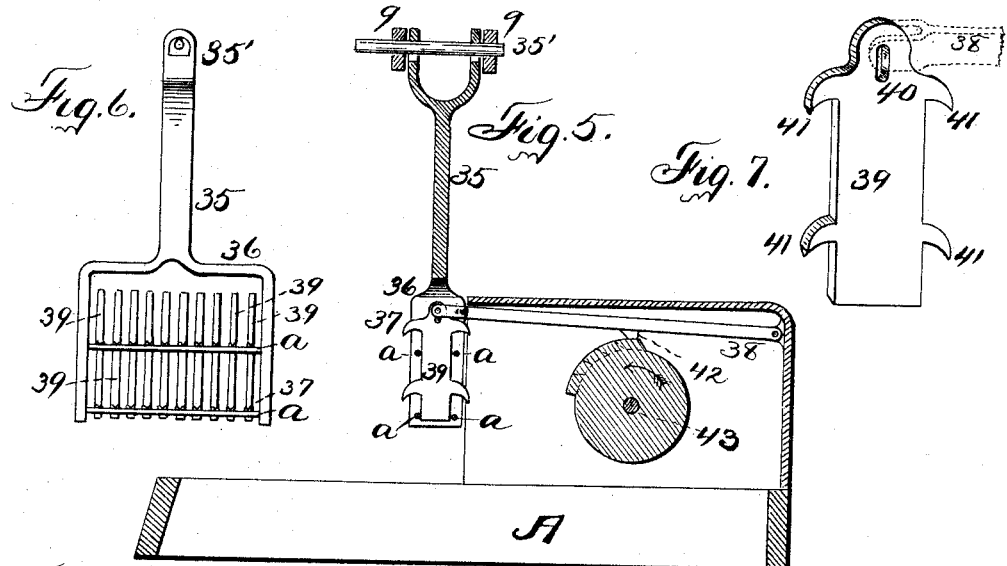
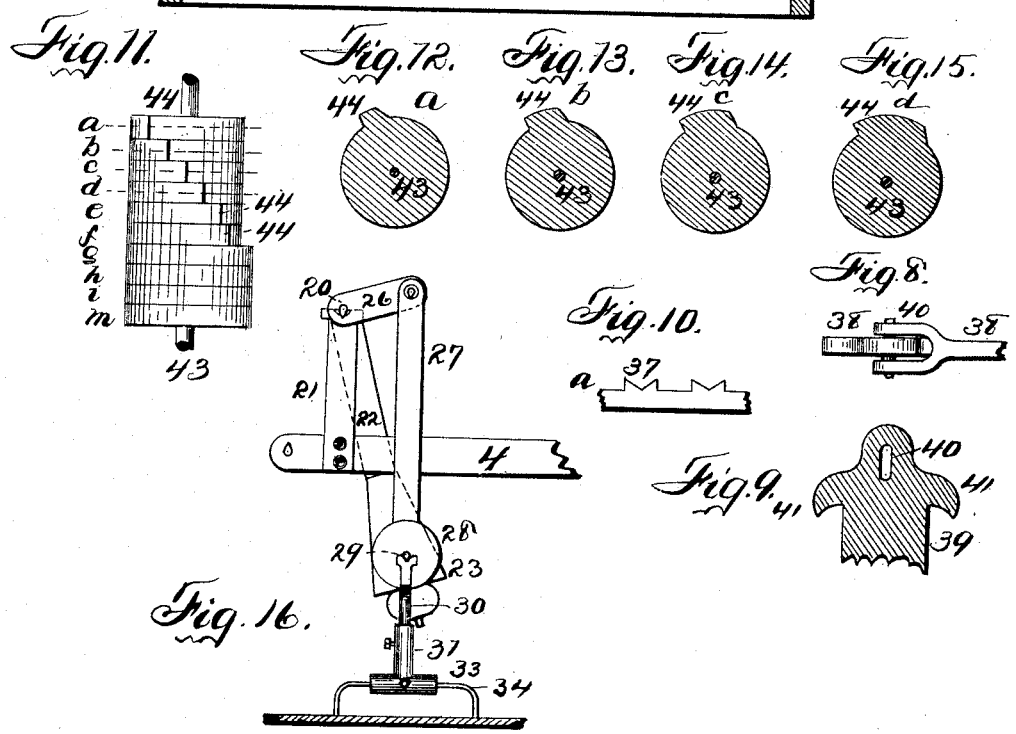
WITNESSES:
INVENTOR
Thomas Joseph Dunlea
BY
Smith & Bruson
ATTORNEYS.

UNITED STATES PATENT OFFICE.

THOMAS JOSEPH DUNLEA, OF BINGHAMTON, NEW YORK.

COMPUTING-SCALE.

SPECIFICATION forming part of Letters Patent No. 616,227, dated December 20, 1898.

Application filed August 23, 1897. Serial No. 649,158. (No model.)

*To all whom it may concern:*

Be it known that I, THOMAS JOSEPH DUNLEA, of Binghamton, in the county of Broome, in the State of New York, have invented new and useful Improvements in Computing-Scales, of which the following, taken in connection with the accompanying drawings, is a full, clear, and exact description.

My invention relates to computing-scales by which an article is weighed and its value computed at the specified rate per pound simultaneous with the act of weighing.

My object is to produce an improved scale of this class embodying a table and scale-beam suitably balanced and adapted to weigh up to a fixed limit, means for actuating a rate-per-pound bar to vibrate in an arc over the face of an arc-shaped table of computed values of pounds and fractions at the respective rates upon the rate-bar, means for vibrating a secondary value-table containing values of multiples of the number of pounds fixed as the primary limit of the weighing-table, and means for mechanically shifting poises in succession from their normal positions into positions to exert their gravity upon the scale-beam according to their predetermined and graded values as weights and according to a stationary scale, each poise possessing an equal value, so that their successive applications to the scale-beam indicates or produces the effect thereon of multiples of such value, and each value is here shown as equal to the predetermined limit of the normal weighing capacity of the table. Special means are also provided for adjusting the scale-beam and table to balance. Means are also provided whereby a single swinging weight or poise permanently connected to the scale-beam effects the weighing by the changing of its position and leverage up to the fixed or normal limit of the table. It is constructed as follows, reference being had to the accompanying drawings, in which—

Figure 1 is a front elevation of the scale. Fig. 2 is a top plan. Fig. 3 is a vertical transverse section on line $x\,x$ in Fig. 1. Fig. 4 is a like section on line $y\,y$. Fig. 5 is a sectional detail of the poise-carriers, poise-cams, and the connection to the scale-beam, whereby each poise when lowered exerts its face thereon. Fig. 6 is an elevation of the yoke-frame connected to the scale-beam, showing all of the poises dropped to exert force thereon. Fig. 7 is an enlarged detail of a poise, its support, and the loose joint between them. Fig. 8 is a top plan of Fig. 7, all in full lines. Fig. 9 is a sectional detail of a poise. Fig. 10 is an enlarged detail of one of the combined poise catches and guides. Fig. 11 is a top plan of the stepped poise-cams. Fig. 12 is a cross-section of cam $a$. Fig. 13 is a like view of cam $b$. Fig. 14 is a like view of cam $c$. Fig. 15 is a like view of cam $d$. Fig. 16 is an enlarged detail in side elevation of the primary swinging poise and of the scale-beam-adjusting devices.

A is a suitable base upon which a standard 2 is erected to carry the scale-beam bearing 3, 4 being said beam; 5, a spider; 6, a weighing-table, and 7 a table-bearing upon said beam, while 8 is a weight adjustable for aiding in balancing the beam and table. The inner end of said beam is broadened out substantially as in the dotted lines in Fig. 2, and its outer end is forked, as at 9, and 10 is a connecting-rod having its upper end journaled to the rod-shaft 35', which is suitably fastened to the fork end 9, and its lower end to the heel of one side of the vibratory frame, comprising sides 11 12, and a cross-bar 13, connecting them, and which is hereinafter called the "rate-bar," as it is graduated and provided with a series of figures indicating rates per pound. This rate-bar is vibrated across the front of the stationary arc-shaped plate 14, which is suitably graduated and carries the computed prices of pounds and ounces at each of the rates shown. This plate is also curved upon an arc of another radius, as at 15, provided with a slot 16 and a stationary table 17 of rates per pound. A secondary value-table, comprising side arms 18, is connected to the gear 53 by the shaft 19. The whole constitutes a frame to carry a suitable auxiliary table of computation of prices of pounds, multiples of the pounds, limit of the primary table, and which is adapted to coincide with the slot 16. As the weighing-table and scale-beam are normally limited to some fixed amount, as three pounds, as here shown, so the tabulation 17 only indicates the values of multiples of three pounds, as six, nine, twelve, &c. From this it follows that Fig. 1 shows the value of two pounds at any of the rates given and also the value of six pounds (through said slot) at the same rate, aggregating eight pounds at any one rate.

A rock-shaft 20 is suitably journaled in uprights 21, erected upon the fork-arms of the scale-beam, and 22 is an arm projecting therefrom, carrying the weight 23, which is adjustable thereon and constitutes a variable equipoise to normally balance the table and beam. A short crank or cranks 24 are secured to said rock-shaft, and 25 is a suitable spring (or springs) connecting each crank to said standard and normally exerting its force to pull said weight down, and thus hold the swinging rate-bar at the normal or zero point. This function is aided by means of a secondary crank 26, secured to said rock-shaft and suitably and loosely connected to a rod 27, the lower end of which is provided with a weight 28, having trunnions 29, which have a rocking bearing in the fork upon the bar 30, which is adjustable in the sleeve 31, or this sleeve is adjustable with a cross-sleeve 33 upon a cross-bar 34, suitably secured to the base.

When an article is placed upon the table, the scale-beam rises. The weight 23 is lowered by the rocking of the rock-shaft through the crank 26 bearing upon the rod 27 and rocking it upon the trunnions 29, and the removal of the article permits all of these parts to return to their normal positions. The weight of the article up to three pounds is shown in pounds and ounces by the position of the upper edge of the vibratory rate-bar, as in Fig. 1 it indicates two pounds, and the figures on that horizontal line in the vertical divisions of the tabulation show the values of two pounds at each of the rates specified upon the rate-bar.

Articles weighing over three pounds are weighed as follows: A yoke-bar 35 is suitably suspended from the rock-shaft 35' or from any other suitable part of the scale-beam fork, and its lower end is also forked in the opposite directions, these fork-arms 36 and their connecting cross-bars $a$ constituting a poise-receiving frame, the upper edges of said cross-bars being provided with beveled notches 37. At suitable points in the frame the parallel poise-holders 38 are suitably hinged at one end, their free ends being forked or otherwise adapted to be connected to the poises 39, which are all in said frame, but are normally out of said engagement therewith. The connection here shown is the slot-and-pin 40. Each poise is provided with lateral ears 41, which are adapted to suitably engage with the notches in said cross-bars of the poise-frame. Each poise-bar 38 is provided with a lug 42. A rock-shaft 43 in the base carries a series of cams $a$, $b$, $c$, $d$, $e$, $f$, $g$, $h$, $i$, and $m$, the number of which can be varied. Each poise-cam has a stud 44, and these studs are in size multiples of that upon the cam $a$. Thus that upon $b$ is twice as long as that of $a$, that upon $c$ three times as long as that of $a$, $d$ four times as long as that of $a$, and so on until that of $m$ is ten times as long as that of $a$. These cams are arranged so that their studs form a series of steps, as shown in Fig. 11. A lever 45 is mechanically connected to this rock-shaft, projecting through a slot 46 in the quadrant 47, the face of which is graduated and numbered substantially as shown. Normally all of the poise-bar lugs rest upon the cam-studs, and then the poise-bars carry the poises clear of the poise-frame. Then when the lever is pulled forward the rock-shaft and all the said cams are revolved according to the extent of the swing of said lever. When cam $a$ is revolved far enough, the lug upon the first poise-bar passes off from the stud thereon, and said lug drops down onto the circular body of said cam and rides there. This deposits the first poise upon the cross-bars of the poise-frame to exert its force upon the scale-beam, here shown as equal to three pounds upon the table, and the poise-bar through said slot-and-pin connection exerts no force upon said beam, being carried by said cam-body. The continued rotation of the rock-shaft successively and in like manner deposits the poises carried by the cams $b$ $c$ $d$ and so on upon the poise-frame to exert their combined force upon the scale-beam. Thus Fig. 1 shows that cams $a$ and $b$ have deposited their poises upon the cam-frame to balance six pounds of the weight of an article, the other two pounds of its weight being shown by the position of the vibratory rate-bar.

Referring to Fig. 3, it will be seen that lever 45 is secured to a shaft 48 to revolve a gear 49 five inches in diameter and an intermediate pinion 50 driving a gear 51 of two and one-half inches in diameter upon the cam rock-shaft 43. A pinion 52 on said shaft 48 drives a gear 53 (dotted lines, Fig. 3) upon the shaft 19 to vibrate the value-table 18 and set to show the value of the multiples of pounds represented by the number of poises deposited upon the poise-frame, all by the swing of the same lever.

Having described my invention, what I claim, and desire to secure by Letters Patent, is—

1. In a scale, a scale-beam and a poise-frame suspended therefrom, combined with poises normally supported within and out of engagement with said frame, and a lever common to all of said poises and whereby they are mechanically and successively deposited upon said frame by the swinging of said lever and the extent of said swing.

2. In a scale, a scale-beam and a poise-frame suspended therefrom, combined with a series of poises, separate bars normally supporting said poises detached from said frame, and a series of rotatable stepped cams each engaging with a poise-bar and adapted when rotated to deposit said poises successively upon said frame to exert force upon said beam.

3. In a scale, a primary table of values, a vibratory rate-bar accompanying it, a vibratory supplemental table of values and a stationary rate-bar accompanying it, combined with a scale-beam, and a hand-lever whereby the vibration of said beam actuates said movable rate-bar to indicate pounds and ounces and their values up to a fixed limit, and said lever actuates said movable value-table to indicate values of multiples of the pounds limit of the primary table.

4. In a scale, the combination with a scale-beam, and weighing-table, of uprights upon said beam, a spring-controlled rock-shaft upon them, a crank-arm upon said shaft, a weighted rod connected to said crank and an adjustable support for said rod in which it is adapted to rock with each vibration of said beam.

5. In a scale, the combination with a scale-beam, and weighing-table, of uprights upon said beam, a spring-controlled rock-shaft upon them, a crank-arm upon said shaft, a weighted rod connected to said crank-arm, an adjustable support for said rod in which it is adapted to rock with each vibration of said beam, and a weighted arm upon said rock-shaft.

6. In a scale, a scale-beam, a frame suspended therefrom, poises within and normally disconnected from said frame, vertically-oscillated bars connected to said poises respectively by a slot-and-pin connection and normally supporting them, combined with a single lever adapted to be swung to lower said bars successively and deposit said poises successively upon said frame and support said bars independent of but not disconnected from said poises.

7. In a scale, a scale-beam, a poise-frame connected thereto, poises supported within said frame, combined with a lever common to all of said poises and poise-guides in said frame and means to vertically reciprocate said poises separately into or out of engagement with said frame by swinging said lever.

8. In a scale, a scale-beam, a poise-frame connected thereto, a series of separated poises within said frame, and means to separately support them, combined with a series of stepped cams secured upon a common rock-shaft and means to rotate said shaft, whereby said poises are successively deposited upon said frame to exert force upon said scale-beam.

In witness whereof I have hereunto set my hand this 11th day of August, 1897.

THOMAS JOSEPH DUNLEA.

In presence of—
THOMAS J. MANGAN,
JOHN J. IRVING.